United States Patent
Sayed et al.

(10) Patent No.: US 10,577,528 B2
(45) Date of Patent: Mar. 3, 2020

(54) FLASH POINT ADJUSTMENT OF WETTABILITY ALTERATION CHEMICALS IN HYDROCARBON SOLVENTS

(71) Applicant: Saudi Arabian Oil Company, Dhahran (SA)

(72) Inventors: Mohammed Ali Ibrahim Sayed, Houston, TX (US); Ghaithan A. Al-Muntasheri, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/279,575

(22) Filed: Feb. 19, 2019

(65) Prior Publication Data

US 2019/0177600 A1    Jun. 13, 2019

Related U.S. Application Data

(62) Division of application No. 14/635,286, filed on Mar. 2, 2015, now Pat. No. 10,253,243.

(Continued)

(51) Int. Cl.
*C09K 8/524* (2006.01)
*C09K 8/86* (2006.01)
(Continued)

(52) U.S. Cl.
CPC ............ *C09K 8/524* (2013.01); *C09K 8/584* (2013.01); *C09K 8/602* (2013.01); *C09K 8/86* (2013.01); *E21B 43/16* (2013.01)

(58) Field of Classification Search
None
See application file for complete search history.

(56) References Cited

U.S. PATENT DOCUMENTS 3,100,524 A    8/1963   Beeson
3,946,812 A    3/1976   Gale
(Continued)

FOREIGN PATENT DOCUMENTS

CA        2617315 A1    2/2007
WO    2014078845 A1    5/2014

OTHER PUBLICATIONS

Al-Anazi, et al., "Laboratory Measurements of Condensate Blocking and Treatment for Both Low and High Permeability Rocks", SPE 77546, 2002.

(Continued)

*Primary Examiner* — Angela M DiTrani Leff
*Assistant Examiner* — Charles R Nold
(74) *Attorney, Agent, or Firm* — Bracewell LLP; Constance G. Rhebergen; Kevin R. Tamm

(57) ABSTRACT

Gas and condensate productivities from a hydrocarbon reservoir can be enhanced using a chemical treatment composition. The chemical treatment composition includes a solvent mixture and a wettability alteration chemical. The solvent mixture includes a solvent that is operable to increase the relative permeability of gas within the hydrocarbon reservoir and the wettability alteration chemical is operable to alter the wettability of surfaces of the hydrocarbon reservoir, in each case enhancing the gas and condensate productivities from the hydrocarbon reservoir. The solvent mixture is selected to provide a chemical treatment composition with a flash point of at least 40° C. (104° F.).

2 Claims, 1 Drawing Sheet

Related U.S. Application Data

(60) Provisional application No. 61/988,655, filed on May 5, 2014.

(51) Int. Cl.
*E21B 43/16* (2006.01)
*C09K 8/584* (2006.01)
*C09K 8/60* (2006.01)

(56) References Cited

U.S. PATENT DOCUMENTS

| | | | |
|---|---|---|---|
| 4,919,827 A | 4/1990 | Harms | |
| 6,534,449 B1 | 3/2003 | Gilmour | |
| 7,273,839 B2 | 9/2007 | Koetzle | |
| 7,316,273 B2 | 1/2008 | Nguyen | |
| 7,552,771 B2 | 6/2009 | Eoff | |
| 7,886,824 B2 | 2/2011 | Kakadjian | |
| 7,987,910 B2 | 8/2011 | Hinkel | |
| 8,092,715 B2 | 1/2012 | Howard | |
| 8,148,303 B2 | 4/2012 | Van | |
| 8,354,042 B2 | 1/2013 | Howard | |
| 8,414,797 B2 | 4/2013 | Howard | |
| 2005/0176116 A1 | 8/2005 | Kobayashi | |
| 2005/0197267 A1 | 9/2005 | Zaki | |
| 2006/0081822 A1 | 4/2006 | Koetzle | |
| 2007/0029085 A1 | 2/2007 | Panga et al. | |
| 2007/0151729 A1 | 7/2007 | Hoch | |
| 2008/0179062 A1 | 7/2008 | Watkins | |
| 2009/0183877 A1* | 7/2009 | Quintero | C09K 8/584 166/300 |
| 2009/0281004 A1* | 11/2009 | Ali | C09K 8/602 507/219 |
| 2010/0224361 A1* | 9/2010 | Pope | C09K 8/584 166/250.02 |
| 2012/0175562 A1 | 7/2012 | Howard | |
| 2013/0217604 A1 | 8/2013 | Van Fisk, Jr. | |
| 2013/0233559 A1 | 9/2013 | Van Zanten et al. | |
| 2013/0252858 A1 | 9/2013 | Plishka | |
| 2014/0121137 A1 | 4/2014 | Andrecola | |
| 2015/0076065 A1* | 3/2015 | Anderson | C02F 1/26 210/643 |

OTHER PUBLICATIONS

Al-Yami, A. M., et al.; A Successful Field Application of a New Chemical Treatment in a Fluid Blocked Well in Saudi Arabia; SPE Saudi Arabia section Annual Technical Symposium and Exhibition, Khobar, SA; May 19-22, 2013; SPE 168086.

Du, L., et al.; Use of Solvents to Improve the Productivity of Gas Condensate Wells, 2000 SPE Annual Technical Conference and Exhibition held in Dallas, Texas; Oct. 1-4, 2000; SPE 62935; Society of Petroleum Engineers, Inc.

PCT International Search Report and the Written Opinion of the International Searching Authority dated Jul. 21, 2015; International Application No. PCT/US2015/029221; International Filing Date: May 5, 2015.

* cited by examiner

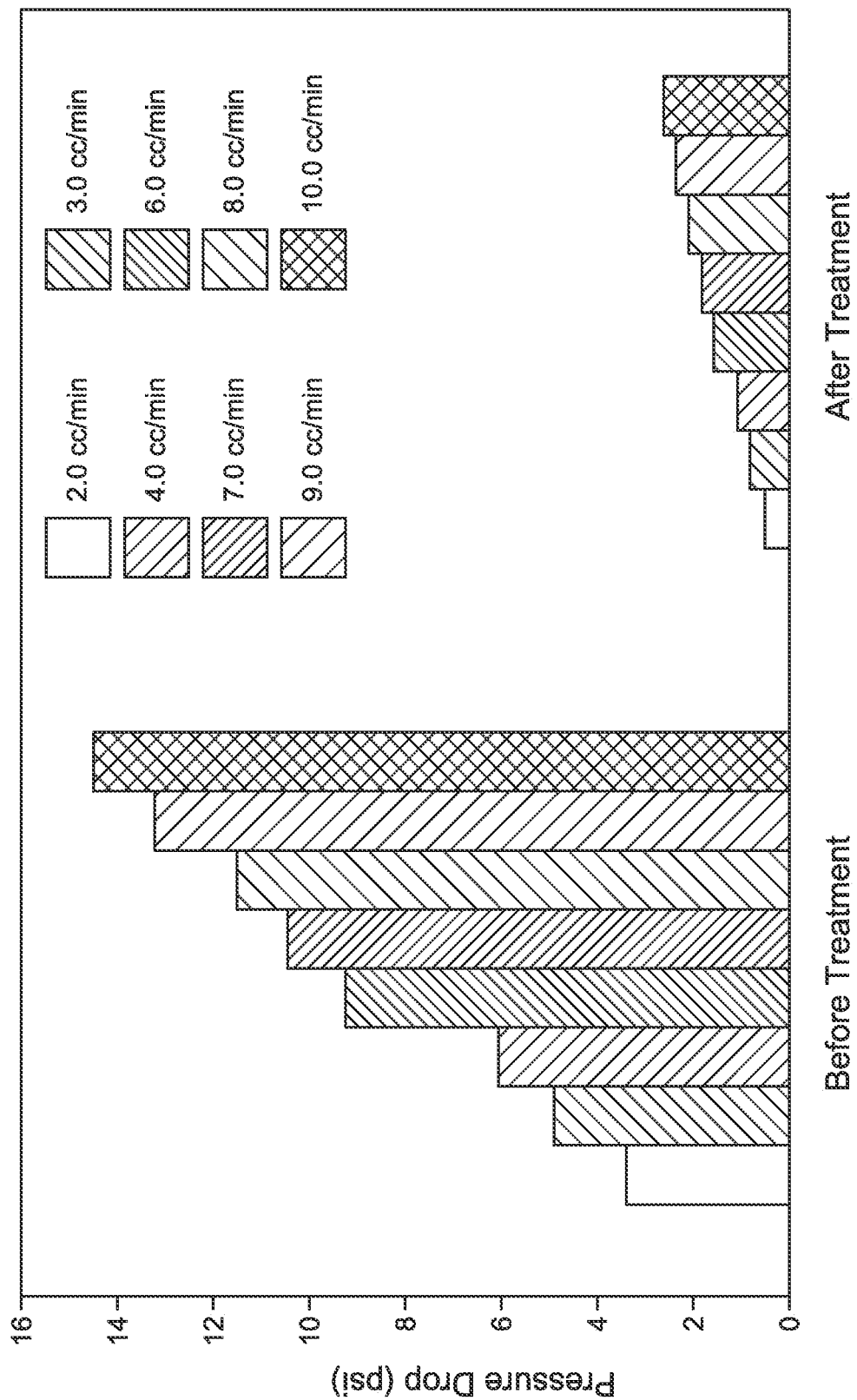

FLASH POINT ADJUSTMENT OF WETTABILITY ALTERATION CHEMICALS IN HYDROCARBON SOLVENTS

CROSS REFERENCE TO RELATED APPLICATIONS

This application is a divisional application of U.S. patent application Ser. No. 14/635,286, filed Mar. 2, 2015, which itself claims priority to and the benefit of U.S. Provisional Patent Application No. 61/988,655, titled "Flash Point Adjustment of Wettability Alteration Chemicals in Hydrocarbon Solvents," filed May 5, 2014, the full disclosures of which are incorporated by reference here in their entirety.

BACKGROUND

Field of the Invention

This invention relates to a composition and method to improve hydrocarbon recovery during a hydrocarbon production operation. More specifically, this invention relates to a composition and method to increase the flash point of wettability alteration chemicals introduced into injection wells.

Description of Background Art

Whenever the bottom-hole flowing pressure of a well drilled in gas-condensate reservoir drops below the dew point, liquid hydrocarbons in the form of condensate accumulates near the wellbore area and forms a condensate bank. As the liquid hydrocarbon saturation in the near-wellbore region increases, the gas relative permeability is decreased. This results in loss of productivity of both gas and condensate. Over time, nearly all gas wells will accumulate condensate or water blockage near the wellbore. In rich gas-condensate reservoirs that have a permeability of less than 100 mD, the formation of condensate banks is even more problematic. Water can also accumulate near the wellbore area due to water flowing from the hydrocarbon reservoir and water aquifers, filtrate water from drilling mud, and water being injected into the wellbore during other operations associated with hydrocarbon production, creating a water bank. Condensate banks and water banks can occur separately or simultaneous and are collectively referred to herein as condensate and water banks.

Several techniques have been used to attempt to remediate the problem of condensate and water banks. These methods include gas cycling, drilling horizontal wells, hydraulic fracturing, acidizing, injection of super critical CO2, and the use of solvents and wettability alteration chemicals. Gas cycling keeps the reservoir pressure higher than the dew point to reduce the liquid drop out. This method is limited by the volumes of gas that can be re-cycled in the reservoir. In order for an ideal recycle, the gas volume injected into the reservoir will be larger than the total gas that can be produced from such a reservoir.

Other approaches for remediating the problem of condensate and water banks are drilling horizontal wells, acidizing and hydraulic fracturing where the pressure drop around the wellbore area is lowered to allow for a longer time of production before the reservoir pressure drops below the dew point. These approaches are costly as they require drilling rigs and they are still a temporary solution for this problem.

Another technique for remediating the problem of condensate and water banks is the use of solvents. Solvents have the potential to remove condensate and water banks around a wellbore. This would allow gas flow to be unimpeded through the near-wellbore region, resulting in smaller drawdown and slower accumulation of condensate. However, the durability of solvents is questionable and the low flash point of some solvent compounds represents a hazardous source of fire and explosion. Moreover, wettability alteration needs to be approached very carefully not to cause permanent damages to the reservoir.

SUMMARY OF THE DISCLOSURE

The use of wettability alteration chemicals, such as fluorinated polymers and surfactants, dissolved in alcohol-based solvents can be effective in reviving wells suffering condensate or water banking, by altering the wettability of surfaces within the hydrocarbon reservoir. However, alcohol-based solvents, including compounds employed in wettability alteration chemicals, pose a serious safety concern. These solvents have a low flash point making them very dangerous to be used in hot summer days. Embodiments of the current disclosure provide a chemical treatment composition that includes a solvent mixture that provides for a higher flash point of the chemical treatment composition, compared to some current chemical treatment compositions. In this way, the chemical treatment composition of this disclosure can be used even in hot weather. After being mixed with the solvent mixture, the wettability alteration chemicals of the chemical treatment composition will still perform the function of altering the contact angle between the liquid phases and reservoir surfaces to contact angles that make the hydrocarbon reservoir surfaces preferentially wetted by gas, so that the reservoir surfaces change from a liquid wet condition, such as water wet or oil wet, to an intermediate wet or gas wet condition. This will allow for more production of both liquid and gas phases of hydrocarbons and water, resulting in an overall increase in recovery and revenue from the hydrocarbon reservoir.

In a first aspect of the present disclosure, a chemical treatment composition that enhances both gas and condensate productivities from a hydrocarbon reservoir includes a solvent mixture and a wettability alteration chemical. The solvent mixture may include a one solvent or a mixture of different solvents or a mixture of one or more solvents and an alcohol. The solvent is operable to increase the relative permeability of gas within the hydrocarbon reservoir and the solvent mixture is selected to provide a chemical treatment composition with a flash point of at least 40° C. (104° F.). The wettability alteration chemical is operable to alter the wettability of reservoir surfaces of the hydrocarbon reservoir to an intermediate wet or gas wet condition.

In embodiments of this disclosure, the solvent mixture can include an alcohol. The alcohol can be a high molecular weight alcohol having at least four carbon atoms per molecule. Alternately, the alcohol can be a terpene alcohol selected from a group consisting of geraniol, citronellol, nerol, menthol, nerolidol, turpentine, D-limonene, farnesol, and combinations of the same. The chemical treatment composition can be 20.0% to 40.0% by weight high molecular weight alcohol, based on the total weight of the blended compound. In embodiments, the alcohol can be a high molecular weight alcohol and can be n-butanol, 1-pentanol, 1-hexanol, 2-butoxyethanol, and combinations of the same.

In alternate embodiments of this disclosure, the wettability alteration chemical is a surfactant and alternately a polymer, a fluorinated polymer, a surfactant, a fluorinated surfactant, a polymeric surfactant, a polymeric fluorinated surfactant, or combinations of the same. The chemical treatment composition can be 0.1% to 10.0% by weight wettability alteration chemical.

In another aspect of the present disclosure, a method for enhancing both gas and condensate productivities from the hydrocarbon reservoir using the chemical treatment composition includes first preparing the chemical treatment composition. The chemical treatment composition includes the wettability alteration chemical and the solvent mixture. The solvent mixture is selected to provide a chemical treatment composition with a flash point of at least 40° C. (104° F.) and includes a solvent or a mixture of different solvents or a mixture of solvent and an alcohol. The chemical treatment composition is injected into the hydrocarbon reservoir at an injection well, in an amount operable to alter the wettability of the hydrocarbon reservoir to an intermediate wet with liquid or preferentially gas wet condition.

In alternate embodiments of this disclosure the chemical treatment composition is injected in an amount operable reduces a condensate or water bank in the hydrocarbon reservoir with the chemical treatment composition. The chemical treatment composition can alternately be injected in an amount operable to increase the relative permeability of the gas within the hydrocarbon reservoir by reducing an interfacial tension between a condensate within the hydrocarbon reserve and the gas with the chemical treatment composition or by dissolving the condensate within the hydrocarbon reservoir with the chemical treatment composition.

The preparation of the chemical treatment composition can include preparing the chemical treatment composition with 20.0% to 40.0% by weight high molecular weight alcohol and alternately with 0.1% to 10.0% by weight wettability alteration chemical. The solvent mixture can be in an amount operable to result in a flash point of the chemical treatment composition of over 65° C. (149° F.). The alcohol can be a high molecular weight alcohol and can be n-butanol, 1-pentanol, 1-hexanol, 2-butoxyethanol and combinations of the same. The wettability alteration chemical can be a surfactant, fluorinated surfactant, fluorinated polymer, or fluorinated polymeric surfactant. The solvent mixture can include an alcohol and the alcohol can be a high molecular weight alcohol that has at least four carbon atoms per molecule.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 1 is a graph showing the pressure drop change before and after the treatment of the rock samples with sample formulation from experimental testing.

DETAILED DESCRIPTION

While the invention will be described with several embodiments, it is understood that one of ordinary skill in the relevant art will appreciate that many examples, variations and alterations to the apparatus and methods described herein are within the scope and spirit of the invention. Accordingly, the exemplary embodiments of the invention described herein are set forth without any loss of generality, and without imposing limitations, on the claimed invention.

Embodiments of this disclosure provide a chemical treatment composition that enhances both gas and condensate productivities from a hydrocarbon reservoir as well as a method for enhancing both gas and condensate productivities from a hydrocarbon reservoir using the chemical treatment composition. The chemical treatment composition includes a solvent mixture. The solvent mixture includes a solvent and in some embodiments, also includes a high molecular weight alcohol.

Solvents can mitigate a condensate and water banking problem by increasing the relative permeability of a gas that has been reduced by condensate, such as condensate that has accumulated near the wellbore area and formed a condensate bank. Solvents can increase the relative permeability of the gas by reducing the interfacial tension between the condensate and gas. Solvents can also increase the relative permeability of the gas by dissolving some of the condensate. As an example, methanol can increase the end-point gas relative permeability by a factor of 1.2 to 2.5 as a result of the miscible displacement of the condensate and water phases by the methanol. Solvents can additionally reduce the dew-point of a mixture of water and condensate, slowing the phenomena of condensate drop-out.

The solvents currently in use in mitigating condensate and overcoming water and condensate banking are generally classified as flammable liquids with relatively low flash-points, such as a flashpoint below 15° C. (59° F.). A flashpoint is the lowest temperature at which the material can vaporize to form an ignitable mixture. A low flash point increases the risk of flammability and fire hazards especially in summer weather time in hot regions. Table 1 shows a summary of some of the properties, including the flash point, of certain solvents.

TABLE 1

Properties Of Solvents Currently Used To Mitigate Condensate Banking.

| Parameter | Methanol | Isopropyl Alcohol | Ethanol |
|---|---|---|---|
| Molecular formula | $CH_4O$ | $C_3H_8O$ | $C_2H_6O$ |
| Molar mass, g $mol^{-1}$ | 32.04 | 60.10 | 46.07 |
| Density, g/cm$^3$ | 0.7918 | 0.786 | 0.789 |
| Boiling point, ° C. | 64.7 (148° F.) | 82.6 (181° F.) | 78.37 (173° F.) |
| Flash Point, ° C. | 12 (54° F.) | 13 (55° F.) | 12 (54° F.) |
| Auto-ignition Temperature, ° C. | 385 | 399 | 425 |

The solvent can alternately be, for example, 2-butoxyethanol and alternately a volatile organic compound, an alcohol, or a combination thereof. As can be seen in Table 2, which lists certain properties of 2-Butoxyethanol, 2-Butoxyethanol has a flash point of 67° C. (153° F.).

TABLE 2

Properties Of 2-Butoxyethanol.

| Parameter | 2-Butoxyethanol |
|---|---|
| Molecular formula | $C_6H_{14}O_2$ |
| Molar mass, g $mol^{-1}$ | 118.17 |

TABLE 2-continued

Properties Of 2-Butoxyethanol.

| Parameter | 2-Butoxyethanol |
| --- | --- |
| Density, g/cm³ | 0.90 |
| Boiling point, ° C. | 171 (340° F.) |
| Flash Point, ° C. | 67 (153° F.) |
| Auto-ignition Temperature, ° C. | 244 |

In embodiments of this disclosure the alcohol to be mixed with the solvent to create the solvent mixture can be a high molecular weight alcohol, and can be selected to provide a chemical treatment composition with a flash point of at least 40° C. (104° F.). The high molecular weight alcohol can be, for example, n-butanol, 1-pentanol, 1-hexanol, and combinations of the same. This will enable the use of the solvents alone or in combination with other wettability alteration chemicals in the field during summer time in the regions where the outdoor temperature during the day time can go up to 40° C. (104° F.), and in certain embodiments, where the outdoor temperature during the day time can go up to 60° C. (140° F.).

The amount of high molecular weight alcohol in the chemical treatment composition can be 20.0% to 40.0% by weight, preferably, 28.0% to 30.0% by weight, based on the total weight of the blended compound. In other embodiments, there may be no separate alcohol added to the solvent mixture and the solvent mixture may comprise a solvent only and may be for example 2-Butoxyethanol. In such an embodiment, the chemical treatment composition can include 90.0% to 99.9% 2-Butoxyethanol by weight, based on the total weight of the blended compound.

Table 3 sets forth data from experimental results relating to various formulations of a chemical treatment composition that includes a high molecular weight alcohol. During the experimental studies, the interfacial tension ("IFT") between deionized water and the tested solutions at reservoir conditions (150° C. (302° F.), and 4000 psi) was determined in order to investigate the solubility of water in these solutions. Some of the tested formulations were completely soluble in water indicated by a zero interfacial tension and others were partially soluble. The values of the interfacial tension and the droplet shape are included in Table 3. The change of the wettability of the sandstone rocks after treating them with the tested formulations was evaluated through measuring the contact angle between water and the rock surface. Certain of the tested formulations were able to change the contact angle from 10° (strong water wetting) to 115°, which is non wetting for water or preferentially gas wetting. Table 3 summarizes the contact angle values measured under reservoir conditions and also the images are included.

TABLE 3

Summary of the Performance of Tested Formulations

| | Sample ID # | | | | | |
| --- | --- | --- | --- | --- | --- | --- |
| | 1 | 2 | 3 | 4 | 5 | 6 |
| Formula | 29% 1-Hexanol, 69% 2-Butoxy Ethanol, 2% Surfactant | 29% Butanol, 69% 2-Butoxy Ethanol, 2% Surfactant | 29% 1-Pentanol, 69% 2-Butoxy Ethanol, 2% Surfactant | 5% Ethanol, 24% Butanol, 69% 2-Butoxy Ethanol, 2% Surfactant | 5% Ethanol, 24% 1-Pentanol, 69% 2-Butoxy Ethanol, 2% Surfactant | 98% 2-Butoxy Ethanol, 2% Surfactant |
| Flash Point | 67° C. | 51° C. | 57° C. | 41° C. | 43° C. | 67° C. |
| AVG IFT @ 150° C., 4000 PSI | 0.78 dyne/cm | 0 Dyne/cm (miscible) | 0.17 dyne/cm | 0 Dyne/cm (miscible) | 0 Dyne/cm (miscible) | 0 Dyne/cm (miscible) |
| Contact Angle @ 150 C., 1000 PSI | (L) 102.7 (R) 116.6 | (L) 109.8 (R) 99.2 | — | (L) 113.3 (R) 117.6 | — | (L) 121.8 (R) 123.2 |
| Contact Angle @ 150 C., 4000 PSI | (L) 93.7 (R) 97.5 | (L) 93.0 (R) 99.9 | — | (L) 73.6 (R) 76.3 | — | (L) 86.6 (R) 85.6 |

Using a core flood testing system, the performance of the chemicals in the porous structure in the rock was evaluated. In one experiment, using a sample formulation that has a flash point of 47° C. (117° F.), the pressure drop after treating the core samples was decreased by 80% compared to the pressure drop before the treatment. This indicates a big change in the rock wettability from water wetting to preferentially gas wetting allowing water to flow at lower pressure drops and so better cleaning and removal of water bank. FIG. 1 shows the reduction in the pressure drop at different flow rates before and after treating the rock samples with the ample formulation at 150° C. (302° F.) and 4000 psi.

In alternate embodiments of this disclosure terpene alcohol, also known as alpha terpineol, is combined with the solvent to create the solvent mixture, to increase the flash point of the chemical treatment composition. The terpene alcohol can be, for example, geraniol, citronellol, nerol, menthol, nerolidol, turpentine, D-limonene, farnesol, or a combination thereof. These terpene alcohols have a vapor pressure that is less than 0.05 mm Hg, thus complying with Exempt VOC standards. The addition of the terpene alcohol to the solvent mixture can result in a solvent mixture with a flash point of greater than 63° C. (145° F.) and alternately, a flash point of greater than 71° C. (160° F.). This will enable the use of the solvents alone or in combination with other wettability alteration chemicals in the field during summer time in the regions where the outdoor temperature during the day time can go up to 60° C. (140° F.).

The amount of terpene alcohol in the chemical treatment composition can be 0.05% to 5.0% by weight, preferably, 2.0% to 4.0% by weight, based on the total weight of the blended compound. Table 4 sets forth the expected increases in flash points of various solvent mixtures, as disclosed in U.S. Pat. No. 8,092,715.

TABLE 4

Modification of the Flash Point of the Solvent Mixture.

| Solvent | % Wt Terpene Alcohol added | Modified Flash Point, ° C. |
|---|---|---|
| Methanol | 3 | 73 (145° F.) |
| Isopropyl Alcohol | 3 | 68 (155° F.) |

After preparing the solvent mixture, the solvent mixture can then be combined with a wettability alteration chemical to create the chemical treatment composition. The wettability alteration chemical alters the wettability of surfaces of the hydrocarbon reservoir. Wettability is the degree of wetting, or the degree to which a liquid maintains contact with a surface and is a function of cohesive and adhesive forces. Different surfaces have different wettabilities for different liquids. A liquid wettable surface is one where a drop of fluid on the surface spreads out along the surface. A liquid non-wettable surface is one where a drop of fluid on the surface stays as a drop of fluid. The wettability alteration chemical can alter the contact angle between the liquid phases and rock surfaces to values that make the rock surface preferentially wetted by gas so that the condensate is expelled. The wettability alteration chemical can also lower the surface tension of the liquids. Therefore the wettability alteration chemicals can change the reservoir surfaces from a liquid wet condition, such as water wet or oil wet, to an intermediate wet with liquid, or gas wet condition. An intermediate wet condition, such as an intermediate wet with liquid condition, is between a water or oil-wet and a gas-wet condition in which some surface or grains are water or oil-wet and others are gas-wet, or is also known as a neutral-wet systems in which the surfaces are not strongly wet by either water or gas. These functions of the wettability alteration chemical will allow for more production of both liquid and gasses and will result in an increase in recovery and revenue from the hydrocarbon reservoir.

The wettability alteration chemical can be a fluorinated chemical, and alternately, can be a polymer, a fluorinated polymer, a surfactant, a fluorinated surfactant, a polymeric surfactant, a polymeric fluorinated surfactant, and combinations thereof. The chemical treatment composition can be 0.1% to 10.0% by weight wettability alteration chemical.

In an example of use, the chemical treatment composition can be used to enhance both gas and condensate productivities from the hydrocarbon reservoir. The chemical treatment composition can be prepared by combining the solvent and a wettability alteration chemical. In alternate embodiments, the high molecular weight alcohol can also be added. The solvent and high molecular weight alcohol can first be combined to form a solvent mixture and then the wettability alteration chemical can be added to the solvent mixture.

The use of the solvent mixture in the chemical treatment composition will allow the chemical treatment composition to be used with a reduce risk of fire and an increase in safety because the use of such solvent mixture can result in the flash point of the chemical treatment composition being at least 40° C. (104° F.), and alternately can increase the flash point of the chemical treatment composition to over 65° C. (149° F.) and up to or over 67° C. (153° F.).

The chemical treatment composition can be injected into the hydrocarbon reservoir at a chemical injection well. The production well can act as the chemical injection well in order for the chemical treatment composition to contact the reservoir surfaces of the hydrocarbon reservoir at the condensate and water bank in the vicinity of the wellbore, and beyond. While the chemical treatment composition is being injected into the hydrocarbon reservoir through the production well, production may need to be halted and the well temporarily shut it in order to allow time for the chemical treatment composition to preform its functions within the hydrocarbon reservoir. The production well may be put back online after the chemical treatment composition has been back-produced.

When the chemical treatment composition contacts the reservoir surfaces, the wettability of the reservoir surfaces will be altered by the chemical treatment composition, and in particular by the wettability alteration chemical. Injecting the chemical treatment composition into the hydrocarbon reservoir can reduce the condensate and water bank in the hydrocarbon reservoir, in particular by the alteration of the wettability of reservoir rock surfaces, and by increasing the relative permeability of the gas within the hydrocarbon reservoir. The relative permeability of the gas within the hydrocarbon reservoir can be increased by reducing the interfacial tension between the condensate and gas and by dissolving some of the condensate within the hydrocarbon reservoir. The relative permeability of the gas within the hydrocarbon reservoir can be increased by the solvent component of the chemical treatment composition.

Although the preparation of the chemical treatment composition has been described as first combining the solvent with the high molecular weight alcohol, then adding the wettability alteration chemical, in alternate embodiments, the solvent, high molecular weight alcohol, and wettability alteration chemical can be combined in other orders.

The methods for enhancing both gas and condensate productivities from a hydrocarbon reservoir using a chemical treatment composition can be part of an overall enhanced oil recovery method or tertiary oil recovery method. The methods for enhancing both gas and condensate productivities from a hydrocarbon reservoir using a chemical treatment composition are particularly suitable for use in gas-condensate type hydrocarbon reservoirs and can be located in sandstone or carbonate fields.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made herein.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present invention.

What is claimed is:

1. A chemical treatment composition that enhances both gas and condensate productivities from a hydrocarbon reservoir, the hydrocarbon reservoir having a reservoir surface, the chemical treatment composition comprising:

a wettability alteration chemical at between about 0.1% to about 10.0% by weight of the chemical treatment composition, wherein the wettability alteration chemical is selected from a group consisting of a fluorinated surfactant, a polymeric surfactant, a polymeric fluorinated surfactant, and combinations of the same, and a solvent mixture, the solvent mixture including a solvent, where the solvent comprises 2-butoxyethanol, and in addition a high molecular weight alcohol combination between about 20.0% and about 40.0% by weight of the chemical treatment composition, wherein the high molecular weight alcohol combination comprises 1-pentanol and 1-hexanol, and wherein the chemical treatment composition is soluble in water with an interfacial tension of less than 0.78 dyne/cm, the 2-butoxyethanol and high molecular weight alcohol combination being first combined before addition of the wettability alteration chemical in amounts operable to result in the selected flash point of at least 40° C.

2. The chemical treatment composition of claim 1, wherein the chemical treatment composition further comprises a compound selected from the group consisting of geraniol, citronellol, nerol, menthol, nerolidol, turpentine, D-limonene, farnesol, and combinations of the same.

* * * * *